US012728619B2

(12) United States Patent
Olson et al.

(10) Patent No.: US 12,728,619 B2
(45) Date of Patent: Sep. 8, 2026

(54) BAFFLES COMPRISING COMPOSITE MATERIALS WITH MEMBRANE

(71) Applicant: The North Face Apparel Corp., Wilmington, DE (US)

(72) Inventors: Cory Michael Olson, Golden, CO (US); Bonny Violet Allison, Denver, CO (US)

(73) Assignee: The North Face Apparel Corp., Wilmington, DE (US)

(*) Notice: Subject to any disclaimer, the term of this patent is extended or adjusted under 35 U.S.C. 154(b) by 183 days.

(21) Appl. No.: 17/774,107

(22) PCT Filed: Nov. 19, 2020

(86) PCT No.: PCT/US2020/061331
§ 371 (c)(1),
(2) Date: May 3, 2022

(87) PCT Pub. No.: WO2021/108223
PCT Pub. Date: Jun. 3, 2021

(65) Prior Publication Data

US 2022/0410526 A1 Dec. 29, 2022

Related U.S. Application Data

(60) Provisional application No. 62/939,942, filed on Nov. 25, 2019.

(51) Int. Cl.

*B32B 5/26* (2006.01)
*B32B 5/02* (2006.01)
*B32B 7/12* (2006.01)

(52) U.S. Cl.

CPC .................. *B32B 5/26* (2013.01); *B32B 5/02* (2013.01); *B32B 7/12* (2013.01); *B32B 2250/03* (2013.01);

(Continued)

(58) Field of Classification Search

CPC ............ B32B 2250/03; B32B 2250/20; B32B 2262/0207; B32B 2262/0253;

(Continued)

(56) References Cited

U.S. PATENT DOCUMENTS 5,027,438 A 7/1991 Schwarze et al.
2008/0182096 A1 7/2008 Johnson et al.

(Continued)

FOREIGN PATENT DOCUMENTS

CN 101815447 A 8/2010
CN 105128442 A 12/2015

(Continued)

OTHER PUBLICATIONS

International Search Report and Written Opinion mailed Feb. 18, 2021 for Application No. PCT/US2020/06133; 14 pages.

(Continued)

*Primary Examiner* — Yan Lan
(74) *Attorney, Agent, or Firm* — Smith, Gambrell & Russell LLP

(57) ABSTRACT

Down-proof baffles are described herein. An example down-proof baffle may comprise composite material. The composite material may be or comprise the shell of the example down-proof baffle. The example composite material may comprise a membrane disposed adjacent one or more layers.

14 Claims, 3 Drawing Sheets

| ID | Fabric Weight | Water Repellency (AATCC 22) - As Received | Water Repellency (AATCC 22) - After 20 Launderings | Low Range Hydrostatic (AATCC 127) - As Received | Low Range Hydrostatic (AATCC 127) - After 20 Launderings | High Range Hydrostatic (ASTM D751) - As Received | High Range Hydrostatic (ASTM D751) - After 20 Launderings | Air Permeability (ASTM D737) - As Received | MVTR (ASTM E96B 19mm air gap) | MVTR (JIS L1099-B1) | Liquid Integrity Test (ASTM F1359M-16a; Modified) |
|---|---|---|---|---|---|---|---|---|---|---|---|
| LV71 | 91 gsm | 100 Points | 80 Points | 9557 mm | 2621 mm | 35 psi | 26 psi | 0.84 cfm | 1129 g/sqm/24hr | 59842 g/sqm/24hr | PASS |
| LWEQ | 168 gsm | 100 Points | 80 Points | 6091 mm | 2978 mm | 40 psi | 29 psi | 0.72 cfm | 921 g/sqm/24hr | 30849 g/sqm/24hr | PASS |
| LV75 | 138 gsm | 100 Points | 100 Points | 5508 mm | 4182 mm | 38 psi | 31 psi | 0.48 cfm | 863 g/sqm/24hr | 31974 g/sqm/24hr | PASS |
| LWEP | 158 gsm | 90 Points | 90 Points | 7166 mm | 2234 mm | 35 psi | 23 psi | 0.70 cfm | 890 g/sqm/24hr | 26089 g/sqm/24hr | PASS |
| LV7B | 163 gsm | 90 Points | 70 Points | 13357 mm | 3223 mm | 42 psi | 39 psi | 0.52 cfm | 920 g/sqm/24hr | 34767 g/sqm/24hr | PASS |
| LV7D | 165 gsm | 90 Points | 70 Points | 9767 mm | 3325 mm | 37 psi | 36 psi | 0.58 cfm | 801 g/sqm/24hr | 37950 g/sqm/24hr | PASS |
| LWEO | 164 gsm | 100 Points | 80 Points | 9398 mm | 4060 mm | 30 psi | 30 psi | 0.90 cfm | 944 g/sqm/24hr | 27544 g/sqm/24hr | PASS |

(52) U.S. Cl.
CPC ... *B32B 2250/20* (2013.01); *B32B 2262/0207* (2013.01); *B32B 2262/0253* (2013.01); *B32B 2262/0261* (2013.01); *B32B 2262/0276* (2013.01); *B32B 2262/062* (2013.01); *B32B 2262/08* (2013.01); *B32B 2307/724* (2013.01); *B32B 2307/7265* (2013.01); *B32B 2437/00* (2013.01)

(58) Field of Classification Search
CPC .... B32B 2262/0261; B32B 2262/0276; B32B 2262/062; B32B 2262/08; B32B 2307/724; B32B 2307/7265; B32B 2437/00; B32B 2437/02; B32B 5/02; B32B 5/26; B32B 7/12; A41D 31/02; A41D 31/065; A41D 31/085
See application file for complete search history.

(56) References Cited

U.S. PATENT DOCUMENTS

| | | | | |
|---|---|---|---|---|
| 2009/0089911 | A1 | 4/2009 | Smith | |
| 2009/0186548 | A1* | 7/2009 | Rock | A41D 31/102 156/244.11 |
| 2010/0316819 | A1 | 12/2010 | Bansal et al. | |
| 2016/0075116 | A1 | 3/2016 | Kai et al. | |
| 2016/0366963 | A1 | 12/2016 | Koshkaroff et al. | |
| 2017/0172240 | A1 | 6/2017 | Massey et al. | |
| 2018/0098588 | A1 | 4/2018 | Pezzimenti et al. | |
| 2020/0009828 | A1* | 1/2020 | Ly | B32B 5/26 |
| 2020/0138134 | A1 | 5/2020 | Mcmahon et al. | |
| 2022/0074090 | A1 | 3/2022 | Olson et al. | |

FOREIGN PATENT DOCUMENTS

| | | | |
|---|---|---|---|
| CN | 105209674 | A | 12/2015 |
| CN | 204894700 | U | 12/2015 |
| CN | 106926551 | A | 7/2017 |
| CN | 108842469 | A | 11/2018 |
| CN | 110079913 | A | 8/2019 |
| CN | 110306351 | A | 10/2019 |
| EP | 2998422 | A1 | 3/2016 |
| JP | 2000073275 | * | 3/2000 |
| JP | 2007-056414 | A | 3/2007 |
| JP | 2008081877 | A | 4/2008 |
| JP | 2010-001576 | A | 1/2010 |
| JP | 2010-030289 | A | 2/2010 |
| JP | 2010-516513 | A | 5/2010 |
| JP | 2013-240910 | A | 12/2013 |
| JP | 201400843 | * | 6/2014 |
| JP | 2015-108214 | A | 6/2015 |
| JP | 2017-518443 | A | 7/2017 |
| JP | 2018-162543 | A | 10/2018 |
| JP | 2020-006687 | A | 1/2020 |
| JP | 7542616 | B2 | 8/2024 |
| KR | 10-2016-0138955 | A | 12/2016 |
| KR | 20190016186 | A | 2/2019 |
| KR | 10-2019-0135529 | A | 12/2019 |
| KR | 10-2020-0005468 | A | 1/2020 |
| TW | 201815559 | A | 5/2018 |
| WO | 2009/048504 | A2 | 4/2009 |
| WO | 2018/213528 | A1 | 11/2018 |
| WO | 2019/222442 | A1 | 11/2019 |

OTHER PUBLICATIONS

International Preliminary Report on Patentability received for PCT Patent Application No. PCT/US20/61331, mailed on Jun. 9, 2022, 9 pages.

Office Action received for Japanese Patent Application No. 2023-514406, mailed on Mar. 5, 2024, 16 pages (10 pages of English Translation and 6 pages of Original Document).

Office Action received for Chinese Patent Application No. 202080069342.2, mailed on Jun. 14, 2024, 12 pages (8 pages of English Translation and 4 pages of Original Document).

Office Action received for Korean Patent Application No. 10-2022-7021735, mailed on May 22, 2024, 10 pages (3 pages of English Translation and 7 pages of Original Document).

International Preliminary Report on Patentability received for PCT Patent Application No. PCT/US21/49157, mailed on Mar. 16, 2023, 9 pages.

Office Action received for Vietnam Patent Application No. 1-2022-01879, mailed on Mar. 31, 2024, 1 page of English translation only.

Office Action received for Vietnam Patent Application No. 1-2023-01483, mailed on Dec. 31, 2024, 2 pages of English translation only.

* cited by examiner

| ID | Fabric Weight | Water Repellency (AATCC 22) - As Received | Water Repellency (AATCC 22) - After 20 Launderings | Low Range Hydrostatic (AATCC 127) - As Received | Low Range Hydrostatic (AATCC 127) - After 20 Launderings | High Range Hydrostatic (ASTM D751) - As Received | High Range Hydrostatic (ASTM D751) - After 20 Launderings | Air Permeability (ASTM D737) - As Received | MVTR (ASTM E96B 19mm air gap) | MVTR (JIS L1099-B1) | Liquid Integrity Test (ASTM F1359M-16a; Modified ) |
|---|---|---|---|---|---|---|---|---|---|---|---|
| A | 132 gsm | 90 Points | 80 Points | 11178 mm | 8083 mm | 39.8 psi | 40 psi | 0.314 cfm | 866 g/sqm/2 4hr | 28687 g/sqm/2 4hr | **FAIL** |
| B | 82 gsm | 90 Points | 90 Points | 1656 mm | 372 mm | 22.8 psi | 5 psi | 0.696 cfm | 883 g/sqm/2 4hr | 47552 g/sqm/2 4hr | PASS |
| C | 182 gsm | 90 Points | 70 Points | 17944 mm | 11903 mm | 75.4 psi | 45 psi | 0.151 cfm | 631 g/sqm/2 4hr | 20398 g/sqm/2 4hr | **FAIL** |
| D | 84 gsm | 90 Points | 80 Points | 4303 mm | 2310 mm | 24.7 psi | 25 psi | 0.966 cfm | 967 g/sqm/2 4hr | 34598 g/sqm/2 4hr | PASS |
| E | 83 gsm | 90 Points | 80 Points | 6531 mm | 6483 mm | 25.9 psi | 50 psi | 0.1 cfm | 685 g/sqm/2 4hr | 22698 g/sqm/2 4hr | **FAIL** |
| F | Body: 150 gsm; Hood: 153 gsm | 90 Points | 80 Points | Body: >20000 mm; Hood: 13716 mm | 15397 mm | Body: 98.4 psi; Hood: 105.5 psi | 90 psi | Body: <0.1 cfm; Hood: 0.10 cfm | Body: 763 g/sqm/2 4hr; Hood: 686 g/sqm/2 4hr | Body: 37515 g/sqm/2 4hr; Hood: 34339 g/sqm/2 4hr | **FAIL** |
| G | Body: 105 gsm; Hood: 115 gsm | 90 Points | 80 Points | Body: 10554 mm; Hood: 10393 mm | 7854 mm | Body: 66.8 psi; Hood: 53.8 psi | 44 psi | Body: 0.11 cfm; Hood: 0.12 cfm | Body: 859 g/sqm/2 4hr; Hood: 835 g/sqm/2 4hr | Body: 58270 g/sqm/2 4hr; Hood: 51274 g/sqm/2 4hr | PASS |
| H | 161 gsm | 100 Points | 80 Points | >20000 mm | >20000 mm | 132 psi | 113 psi | <0.1 cfm | 845 g/sqm/2 4hr | 20658 g/sqm/2 4hr | PASS |

FIG. 1

| ID | Fabric Weight | Water Repellency (AATCC 22) - As Received | Water Repellency (AATCC 22) - After 20 Launderings | Low Range Hydrostatic (AATCC 127) - As Received | Low Range Hydrostatic (AATCC 127) - After 20 Launderings | High Range Hydrostatic (ASTM D751) - As Received | High Range Hydrostatic (ASTM D751) - After 20 Launderings | Air Permeability (ASTM D737) - As Received | MVTR (ASTM E96B 19mm air gap) | MVTR (JIS L1099-B1) | Liquid Integrity Test (ASTM F1359M-16a; Modified) |
|---|---|---|---|---|---|---|---|---|---|---|---|
| I | 120 gsm | 100 Points | 80 Points | >20000 mm | 10000 mm | 107 psi | 113 psi | 0.12 cfm | 848 g/sqm/2 4hr | 37847 g/sqm/2 4hr | PASS |
| J | 54 gsm | 100 Points | 80 Points | 8374 mm | 2958 mm | 59 psi | 60 psi | <0.1 cfm | 733 g/sqm/2 4hr | 42758 g/sqm/2 4hr | PASS |
| K | 64 gsm | 90 Points | 80 Points | 2158 mm | 1173 mm | 24 psi | 15 psi | <0.1 cfm | 652 g/sqm/2 4hr | 6548 g/sqm/2 4hr | PASS |
| L | 114 gsm | 100 Points | 90 Points | >20000 mm | >20000 mm | 139 psi | 133 psi | 0.15 cfm | 639 g/sqm/2 4hr | 20008 g/sqm/2 4hr | **FAIL** |
| LV6W | 102 gsm | 90 Points | 80 Points | 9823 mm | 4554 mm | 34 psi | 28 psi | 0.60 cfm | 1150 g/sqm/2 4hr | 41926 g/sqm/2 4hr | PASS |
| LV6Z | 177 gsm | 100 Points | 90 Points | 13286 mm | 4345 mm | 43 psi | 29 psi | 0.59 cfm | 801 g/sqm/2 4hr | 34910 g/sqm/2 4hr | PASS |
| LV74 | 173 gsm | 90 Points | 90 Points | 11822 mm | 5086 mm | 34 psi | 28 psi | 0.42 cfm | 909 g/sqm/2 4hr | 40016 g/sqm/2 4hr | PASS |
| LWEN | 160 gsm | 90 Points | 90 Points | 6768 mm | 3322 mm | 29 psi | 25 psi | 0.73 cfm | 903 g/sqm/2 4hr | 23022 g/sqm/2 4hr | PASS |

FIG. 2

| ID | Fabric Weight | Water Repellency (AATCC 22) - As Received | Water Repellency (AATCC 22) After 20 Launderings | Low Range Hydrostatic (AATCC 127) - As Received | Low Range Hydrostatic (AATCC 127) - After 20 Launderings | High Range Hydrostatic (ASTM D751) - As Received | High Range Hydrostatic (ASTM D751) - After 20 Launderings | Air Permeability (ASTM D737) - As Received | MVTR (ASTM E96B 19mm air gap) | MVTR (JIS L1099-B1) | Liquid Integrity Test (ASTM F1359M-16a; Modified) |
|---|---|---|---|---|---|---|---|---|---|---|---|
| LV71 | 91 gsm | 100 Points | 80 Points | 9557 mm | 2621 mm | 35 psi | 25 psi | 0.84 cfm | 1129 g/sqm/24hr | 59842 g/sqm/24hr | PASS |
| LWEQ | 168 gsm | 100 Points | 80 Points | 8991 mm | 2978 mm | 40 psi | 29 psi | 0.72 cfm | 921 g/sqm/24hr | 30649 g/sqm/24hr | PASS |
| LV75 | 136 gsm | 100 Points | 100 Points | 5508 mm | 4182 mm | 38 psi | 31 psi | 0.48 cfm | 863 g/sqm/24hr | 31974 g/sqm/24hr | PASS |
| LWEP | 158 gsm | 90 Points | 90 Points | 7186 mm | 2234 mm | 35 psi | 23 psi | 0.70 cfm | 890 g/sqm/24hr | 26089 g/sqm/24hr | PASS |
| LV7B | 163 gsm | 90 Points | 70 Points | 13357 mm | 3223 mm | 42 psi | 39 psi | 0.52 cfm | 920 g/sqm/24hr | 34767 g/sqm/24hr | PASS |
| LV7D | 165 gsm | 90 Points | 70 Points | 9767 mm | 3325 mm | 37 psi | 36 psi | 0.58 cfm | 801 g/sqm/24hr | 37950 g/sqm/24hr | PASS |
| LWEO | 164 gsm | 100 Points | 80 Points | 9399 mm | 4060 mm | 30 psi | 30 psi | 0.90 cfm | 944 g/sqm/24hr | 27544 g/sqm/24hr | PASS |

FIG. 3

BAFFLES COMPRISING COMPOSITE MATERIALS WITH MEMBRANE

CROSS-REFERENCE TO RELATED APPLICATIONS

This application is a U.S. National Stage Application filed under 35 U.S.C. § 371(a) of International Patent Application Serial No. PCT/US2020/0061331, filed Nov. 19, 2020, which claims the benefit of and priority to U.S. Provisional Application No. 62/939,942 filed Nov. 25, 2019, each of which are hereby incorporated by reference in its entirety.

BACKGROUND

Some items, such as snow pants, footwear, tents, etc., may be useful for keeping users comfortable. Keeping users comfortable may comprise keeping users dry from rain, hail, snow, etc. Making items out of material that is sufficiently water-resistant may keep users dry. Keeping users comfortable may comprise allowing hot air to escape so that users may remain cool. Making items out of material that is sufficiently breathable may allow hot air to escape. Improvements are needed.

SUMMARY

Composite materials are described herein. An example composite material may comprise a shell fiber layer. The example composite material may comprise a membrane disposed adjacent the shell fiber layer. The example composite material may exhibit a low range hydrostatic water resistance of above 5000 millimeter (mm) as measured using American Association of Textile Chemists and Colorists (AATCC) 127. The example composite material may exhibit an air permeability of above 0.25 cubic feet per minute (cfm) as measured using American Society for Testing and Materials (ASTM) D737. The example composite material may exhibit a moisture vapor transmission rate (MVTR) of above 30 kilogram per square meter per 24 hour (kg/sqm/24 hr) as measured using Japanese Industry Standards (JIS) L1099-B1.

Composite materials are described herein. An example composite material may comprise a shell fiber layer. The example composite material may comprise a membrane disposed adjacent the shell fiber layer. The example composite material may exhibit a low range hydrostatic water resistance of between 5000 millimeter (mm) and 25,000 mm as measured using American Association of Textile Chemists and Colorists (AATCC) 127. The example composite material may exhibit an air permeability of between 0.25 and 1 cubic feet per minute (cfm) as measured using American Society for Testing and Materials (ASTM) D737. The example composite material may exhibit a moisture vapor transmission rate (MVTR) of between 30 kilogram per square meter per 24 hour (kg/sqm/24 hr) and 60 Kg/sqm/24 hr as measured using Japanese Industry Standards (JIS) L1099-B1.

Composite materials are described herein. An example composite material may comprise a shell fiber layer. The example composite material may comprise a membrane disposed adjacent the shell fiber layer. The example composite material may exhibit a low range hydrostatic water resistance of between 5000 millimeter (mm) and 25,000 mm as measured using American Association of Textile Chemists and Colorists (AATCC) 127. The example composite material may exhibit an air permeability of between 0.25 and 1 cubic feet per minute (cfm) as measured using American Society for Testing and Materials (ASTM) D737. The example composite material may exhibit a moisture vapor transmission rate (MVTR) of between 30 kilogram per square meter per 24 hour (kg/sqm/24 hr) and 55 Kg/sqm/24 hr as measured using Japanese Industry Standards (JIS) L1099-B1.

Composite materials are described herein. An example composite material may comprise a shell fiber layer. The example composite material may comprise a membrane disposed adjacent the shell fiber layer. The example composite material may exhibit a low range hydrostatic water resistance of between 5000 millimeter (mm) and 25,000 mm as measured using American Association of Textile Chemists and Colorists (AATCC) 127. The example composite material may exhibit an air permeability of between 0.75 and 1 cubic feet per minute (cfm) as measured using American Society for Testing and Materials (ASTM) D737.

Down-proof baffles are described herein. An example down-proof baffle may comprise composite material. The example composite material may comprise a membrane disposed adjacent a face layer and a backer layer adjacent the membrane opposite the face layer. The example composite material may exhibit a low range hydrostatic water resistance of between 0 millimeter (mm) and 16,000 mm as measured using American Association of Textile Chemists and Colorists (AATCC) 127. The example composite material may exhibit an air permeability of between 0.1 and 1.5 cubic feet per minute (cfm) as measured using American Society for Testing and Materials (ASTM) D737. The example composite material may exhibit a moisture vapor transmission rate (MVTR) of between 2 kilogram per square meter per 24 hour (kg/sqm/24 hr) and 65 Kg/sqm/24 hr as measured using Japanese Industry Standards (JIS) L1099-B1.

Down-proof baffles are described herein. An example down-proof baffle may comprise composite material. The example composite material may comprise a membrane disposed adjacent a face layer and a backer layer adjacent the membrane opposite the face layer. The example composite material may exhibit a low range hydrostatic water resistance of between 2000 millimeter (mm) and 15,000 mm as measured using American Association of Textile Chemists and Colorists (AATCC) 127. The example composite material may exhibit an air permeability of between 0.1 and 1.0 cubic feet per minute (cfm) as measured using American Society for Testing and Materials (ASTM) D737. The example composite material may exhibit a moisture vapor transmission rate (MVTR) of between 1 kilogram per square meter per 24 hour (kg/sqm/24 hr) and 65 Kg/sqm/24 hr as measured using Japanese Industry Standards (JIS) L1099-B1.

Down-proof baffles are described herein. Down-proof, as used herein, may comprise minimizing or preventing leakage or pricking of down or fill material (e.g., thermal insulation, feathers, fibers, etc.). Down-proof baffles may be constructed in accordance with the present disclosure without impeding breathability of an article or a composite material. Down-proof baffles may eliminate the need for ticking or other such tightly woven materials typically used in stuffed or insulative articles. An example down-proof baffle may comprise composite material. The example composite material may comprise a membrane disposed adjacent a face layer and a backer layer adjacent the membrane opposite the face layer. The example composite material may exhibit a low range hydrostatic water resistance greater than 9000 millimeter (mm) as measured using American Association of Textile Chemists and Colorists (AATCC) 127. The example composite material may exhibit an air permeability greater than 0.2 cubic feet per minute (cfm) as measured using American Society for Testing and Materials (ASTM) D737. The example composite material may exhibit a moisture vapor transmission rate (MVTR) greater than 8 kilogram per square meter per 24 hour (kg/sqm/24 hr) as measured using Japanese Industry Standards (JIS) L1099-B1.

Articles are described herein. An example article may comprise down-proof baffles described herein. An example down-proof baffle may comprise composite material described herein. The example article may comprise a garment, gloves, footwear, headwear, bib pants, pants, a jacket, a tent, a sleeping bag, a blanket and a backpack. Other articles may be used.

BRIEF DESCRIPTION OF THE DRAWINGS

The following drawings show generally, by way of example, but not by way of limitation, various examples discussed in the present disclosure. In the drawings:

FIG. 1 shows an example footwear article in accordance with the present disclosure.

FIG. 2 illustrates an example mold in accordance with the present disclosure.

FIG. 3 shows side views of the example mold of FIG. 2A before it is closed in accordance with the present disclosure.

DETAILED DESCRIPTION

Composite materials are described herein. The composite materials may be or comprise laminate materials having a plurality of layers. An example composite material may comprise a shell and a membrane. The shell may comprise a shell fiber layer. The shell may comprise various materials such as polymers. The shell may comprise polyester, nylon, recycled polyester, elastane, or combinations thereof. Other materials may be used. The membrane may be or comprise a breathable membrane. The membrane may be or comprise a water proof or water repellant membrane. The membrane may be formed from various process such as fiber spinning (e.g., electrospinning). Together, the shell and membrane may have a fabric weight. Various combinations of shell and membrane weight may be used. The membrane may have a weight of less than 9 gsm, less than 8 gsm, less than 7 gsm, less than 6 gsm, less than 5 gsm, less than 4 gsm, or less than 3 gsm. Other weight membranes may be used. The shell and the membrane may be disposed adjacent each other and may be coupled together, for example using adhesive.

Down-proof baffles are described herein. An example down-proof baffle may be configured to hold an insulative material or structure. The example down-proof baffle may comprise composite material and a membrane. The composite material may be or comprise the shell of the down-proof baffle. The composite material may be or comprise laminate materials having a plurality of layers. The layers may comprise nylon, polyester, elastane, cotton, wool, polypropylene, polyethylene or combinations thereof. The layers may comprise dissolvable yarns for enhanced or engineered breathability. Other materials may be used. The membrane may be or comprise a water proof or water repellant membrane. The membrane may be formed from various process such as fiber spinning (e.g., electrospinning).

An example composite material for a down-proof baffle may comprise a membrane and one or more layers disposed adjacent the membrane. The example composite material may comprise a membrane disposed adjacent a face layer. The example composite material may comprise a backer layer disposed adjacent the membrane opposite the face layer. The backer layer may be down-proof. Additional layers may be included. The membrane and the layers may be coupled together, for example with glue or adhesive. Together, the layers and the membrane may have a fabric weight. Various combinations of membrane and layers may be used. The membrane may have a weight of less than 9 gsm, less than 8 gsm, less than 7 gsm, less than 6 gsm, less than 5 gsm, less than 4 gsm, or less than 3 gsm. Other weight membranes may be used.

The composites of the present disclosure show improved performance over comparative conventional materials. As shown more clearly in Tables 1-3, the composite materials of the present disclosure are identified using ID's: LV6W, LV6Z, LV74, LWEN, LV71, LWEQ, LV75, LWEP, LV7B, LV7D, and LWEO. The comparative examples are identified as A-L. FIGS. 1-3 are tables showing improved performance of the composite materials after 20 launderings.

Table 1 matches "High", "Medium", and "Low" labels for example value ranges for various measurements:

| KEY | Low Range Hydrostatic (AATCC 127) - As Received | Air Permeability (ASTM D737) - As Received | MVTR (JIS L1099-B1) |
|---|---|---|---|
| High | 10,000 mm+ | .75 cfm+ | 45K g/sqm/24 hr+ |
| Medium | 5,000-10,000 mm | .25-.75 cfm | 30K-45K g/sqm/24 hr |
| Low | 0-5,000 mm | 0-0.25 cfm | 0-30K g/sqm/24 hr |

Table 2 shows attributes of various jackets:

| ID | Shell Fiber Content | Fabric Weight |
|---|---|---|
| A | 72% Polyester, 28% Nylon | 132 gsm |
| B | 100% Nylon | 82 gsm |
| C | 100% Nylon | 182 gsm |
| D | 100% Nylon with 100% Polyester Backer | 84 gsm |
| E | 100% Nylon | 83 gsm |
| F | 100% Recycled Polyester | Body: 150 gsm; Hood: 153 gsm |
| G | 100% Nylon | Body: 105 gsm; Hood: 115 gsm |
| H | 100% Nylon | 161 gsm |
| I | 100% Nylon | 120 gsm |
| J | 100% Nylon | 54 gsm |
| K | 100% Nylon | 64 gsm |
| L | 100% Recycled Polyester | 114 gsm |
| LV6W | 58% Nylon, 37% Polyester, 5% Elastane | 102 gsm |
| LV6Z | 100% Polyester | 177 gsm |
| LV74 | 100% Polyester | 173 gsm |
| LWEN | 93% Nylon, 7% Elastane | 160 gsm |
| LV71 | 100% Polyester | 91 gsm |
| LWEQ | 93% Nylon, 7% Elastane | 168 gsm |
| LV75 | 62% Nylon, 33% Polyester, 5% Elastane | 136 gsm |
| LWEP | 93% Nylon, 7% Elastane | 158 gsm |
| LV7B | 75% Polyester, 25% Nylon | 163 gsm |

-continued

| ID | Shell Fiber Content | Fabric Weight |
|---|---|---|
| LV7D | 75% Polyester, 25% Nylon | 165 gsm |
| LWEO | 96% Nylon, 4% Elastane | 164 gsm |

Table 3 matches labels shows in Table 1 with jackets identified in Table 2.

| ID | Low Range Hydrostatic (AATCC 127) - As Received | Air Permeability (ASTM D737) - As Received | MVTR (JIS L1099-B1) |
|---|---|---|---|
| A | High | Medium | Low |
| B | Low | Medium | High |
| C | High | Low | Low |
| D | Low | High | Medium |
| E | Medium | Low | Low |
| F | High | Low | Medium |
| G | High | Low | High |
| H | High | Low | Low |
| I | High | Low | Medium |
| J | Medium | Low | Medium |
| K | Low | Low | Low |
| L | High | Low | Low |
| LV6W | Medium | Medium | Medium |
| LV6Z | High | Medium | Medium |
| LV74 | High | Medium | Medium |
| LWEN | Medium | Medium | Low |
| LV71 | Medium | High | High |
| LWEQ | Medium | Medium | Medium |
| LV75 | Medium | Medium | Medium |
| LWEP | Medium | Medium | Low |
| LV7B | High | Medium | Medium |
| LV7D | Medium | Medium | Medium |
| LWEO | Medium | High | Low |

Composite materials are described herein. An example composite material may comprise a shell fiber layer. The shell fiber layer may comprise one or more of nylon, polyester, or elastane. The shell fiber layer may consist essentially of one or more of nylon, polyester, or elastane. The shell fiber layer may comprise about 100 weight percent (wt %) polyester from a total of 100 wt % of the shell fiber layer. The shell fiber layer may comprise greater than 90 wt % polyester from a total of 100 wt %. The shell fiber layer may comprise about 90 wt %, 91 wt %, 92 wt %, 93 wt %, 94 wt %, 95 wt %, 96 wt %, 97 wt %, 98 wt %, 99 wt %. Other loadings may be used. The shell fiber layer may comprise about 58 wt % nylon, about 37 wt % polyester, and about 5 wt % elastane. The shell fiber layer may comprise about 93 wt % nylon and about 7 wt % elastane. The shell fiber layer may comprise between 50 wt % and 100 wt % nylon. The shell fiber layer may comprise nylon by weight percent wt % as 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt % based on 100 wt % of the composite material. Other loadings may be used. The shell fiber layer may comprise about 62 wt % nylon, about 33 wt % polyester, and about 5 wt % elastane. The shell fiber layer may comprise about 93 wt % nylon and about 7 wt % elastane. The shell fiber layer may comprise about 75 wt % polyester and about 25 wt % nylon. The shell fiber layer may comprise 96% nylon, 4% elastane.

The example composite material may comprise a membrane disposed adjacent the shell fiber layer. The membrane may be coupled to the shell fiber layer. The membrane may be glued to the shell fiber layer.

Composite materials are described herein. An example composite material may comprise a shell fiber layer. The example composite material may comprise a membrane disposed adjacent the shell fiber layer. The example composite material may exhibit a low range hydrostatic water resistance of above 5000 millimeter (mm) as measured using American Association of Textile Chemists and Colorists (AATCC) 127. The example composite material may exhibit an air permeability of above 0.25 as measured using American Society for Testing and Materials (ASTM) D737. The example composite material may exhibit a moisture vapor transmission rate (MVTR) of above 30 kilogram per square meter per 24 hour (kg/sqm/24 hr) as measured using Japanese Industry Standards (JIS) L1099-B1.

The example composite material may exhibit a low range hydrostatic water resistance of between 5000 millimeter (mm) and 25,000 mm as measured using American Association of Textile Chemists and Colorists (AATCC) 127. The example composite material may exhibit an air permeability of between 0.25 and 1 cubic feet per minute (cfm) as measured using American Society for Testing and Materials (ASTM) D737. The example composite material may exhibit a moisture vapor transmission rate (MVTR) of between 30 kilogram per square meter per 24 hour (kg/sqm/24 hr) and 55 Kg/sqm/24 hr as measured using Japanese Industry Standards (JIS) L1099-B1.

A fabric weight associated with the example composite material may be between 90 grams per square meter (gsm) and 200 gsm. A fabric weight associated with the example composite material may be between 90 gsm and 180 gsm. A fabric weight associated with the example composite material may be between 91 gsm and 177 gsm. Other fabric weights and component weights may be used.

The example composite material may exhibit a low range hydrostatic water resistance of between 5000 millimeter (mm) and 25,000 mm as measured using American Association of Textile Chemists and Colorists (AATCC) 127. The example composite material may exhibit an air permeability of between 0.75 and 1 cubic feet per minute (cfm) as measured using American Society for Testing and Materials (ASTM) D737.

A fabric weight associated with the example composite material may be between 90 grams per square meter (gsm) and 200 gsm. A fabric weight associated with the example composite material may be between 90 gsm and 180 gsm. A fabric weight associated with the example composite material may be between 91 gsm and 177 gsm.

The example composite material for a down-proof baffle may exhibit a low range hydrostatic water resistance of between 0 millimeter (mm) and 16,000 mm as measured using American Association of Textile Chemists and Colorists (AATCC) 127. The example composite material may exhibit an air permeability of between 0.1 and 1.5 cubic feet per minute (cfm) as measured using American Society for Testing and Materials (ASTM) D737. The example composite material may exhibit a moisture vapor transmission rate (MVTR) of between 2 kilogram per square meter per 24 hour (kg/sqm/24 hr) and 65 Kg/sqm/24 hr as measured using Japanese Industry Standards (JIS) L1099-B1.

The example composite material for a down-proof baffle may exhibit a low range hydrostatic water resistance of between 2000 millimeter (mm) and 15,000 mm as measured using American Association of Textile Chemists and Colorists (AATCC) 127. The example composite material may exhibit an air permeability of between 0.1 and 1.0 cubic feet per minute (cfm) as measured using American Society for Testing and Materials (ASTM) D737. The example composite material may exhibit a moisture vapor transmission rate (MVTR) of between 1 kilogram per square meter per 24 hour (kg/sqm/24 hr) and 65 Kg/sqm/24 hr as measured using Japanese Industry Standards (JIS) L1099-B1.

The example composite material for a down-proof baffle may exhibit a low range hydrostatic water resistance greater than 9000 millimeter (mm) as measured using American Association of Textile Chemists and Colorists (AATCC) 127. The example composite material may exhibit an air permeability greater than 0.2 cubic feet per minute (cfm) as measured using American Society for Testing and Materials (ASTM) D737. The example composite material may exhibit a moisture vapor transmission rate (MVTR) greater than 8 kilogram per square meter per 24 hour (kg/sqm/24 hr) as measured using Japanese Industry Standards (JIS) L1099-B1.

Articles are described herein. An example article may comprise composite material described herein. The example article may comprise a garment, gloves, footwear, headwear, bib pants, pants, a jacket, a tent, a sleeping bag, blanket and a backpack. The example article may comprise a plurality of down-proof baffles described herein. The example down-proof baffles may be seam-sealed to provide a fully waterproof article. The example down-proof baffle may be configured to hold an insulative material or structure.

What is claimed is:

1. A down-proof baffle having a baffle shell formed from a composite material, wherein the composite material comprises:
- a membrane;
- a face layer disposed adjacent a first side of the membrane; and
- a backer layer disposed adjacent a second side of the membrane opposite the face layer to effect the down-proofing;
- wherein the composite material exhibits a low range hydrostatic water resistance as received of between 5000 mm and 15000 mm and, after 20 launderings, of between 2000 mm and 6000 mm, each as measured using AATCC 127,
- wherein the composite material exhibits an air permeability of between 0.40 cfm and 0.90 cfm as measured using ASTM D737, and
- wherein the composite material exhibits a moisture vapor transmission rate (MVTR) of greater than 8000 g/sqm/24 hr as measured using JIS L1099-B1,
- wherein the composite material exhibits a high range hydrostatic water resistance, after 20 launderings, of between 23 psi and 39 psi as measured using ASTM D751, and
- wherein the composite material has a fabric weight of less than 200 gsm.

2. The down-proof baffle of claim 1, wherein the face layer comprises one or more of nylon, polyester, elastane, cotton, wool, polypropylene and polyethylene.

3. The down-proof baffle of claim 1, wherein the backer layer consists essentially of one or more of nylon, polyester, elastane, cotton, wool, polypropylene and polyethylene.

4. The down-proof baffle of claim 1, wherein the face layer comprises dissolvable yarns.

5. The down-proof baffle of claim 1, wherein the backer layer comprises dissolvable yarns.

6. The down-proof baffle of claim 1, wherein the membrane is coupled to the face layer.

7. The down-proof baffle of claim 1, wherein the down-proof baffle is configured to hold an insulative material or structure.

8. A down-proof baffle having a baffle shell formed from a composite material, wherein the composite material comprises:
- a membrane;
- a face layer disposed adjacent a first side of the membrane; and
- a backer layer disposed adjacent a second side of the membrane opposite the face layer to effect the down-proofing;
- wherein the composite material exhibits a low range hydrostatic water resistance as received of between 5000 mm and 15000 mm and, after 20 launderings, of between 2000 mm and 6000 mm, as measured using AATCC 127,
- wherein the composite material exhibits an air permeability greater than 0.25 cfm as measured using ASTM D737, and
- wherein the composite material exhibits a moisture vapor transmission rate (MVTR) of greater than 8000 g/sqm/24 hr as measured using JIS L1099-B1,
- wherein the composite material exhibits a high range hydrostatic water resistance, after 20 launderings, of between 23 psi and 39 psi as measured using ASTM D751, and
- wherein the composite material has a fabric weight of between 90 grams per square meter (gsm) and 200 gsm.

9. The down-proof baffle of claim 8, wherein the face layer comprises one or more of nylon, polyester, elastane, cotton, wool, polypropylene and polyethylene.

10. The down-proof baffle of claim 8, wherein the backer layer consists essentially of one or more of nylon, polyester, elastane, cotton, wool, polypropylene and polyethylene.

11. The down-proof baffle of claim 8, wherein the face layer comprises dissolvable yarns.

12. The down-proof baffle of claim 8, wherein the backer layer comprises dissolvable yarns.

13. The down-proof baffle of claim 8, wherein the membrane is coupled to the face layer.

14. The down-proof baffle of claim 8, wherein the down-proof baffle is configured to hold an insulative material or structure.

* * * * *